Patented Feb. 3, 1948

2,435,252

UNITED STATES PATENT OFFICE 2,435,252

ARYL PHOSPHORUS CONTAINING RESINS AND THE METHOD OF PREPARING THE SAME

Arthur Dock Fon Toy, Chicago, Ill., assignor to Victor Chemical Works, a corporation of Illinois No Drawing. Application January 1, 1944, Serial No. 516,713

11 Claims. (Cl. 260—47)

This invention relates to organic phosphorus containing resins and more particularly to condensation products of phosphorus dihalide compounds with aromatic dihydroxy compounds in which the hydroxy radicals are non-adjacent.

I have discovered that organic phosphorus dihalide compounds will condense with non-adjacent dihydroxy aromatic compounds, liberating hydrogen chloride and forming resins of the linear polymer type, when mixtures of these compounds are heated, preferably under vacuum.

The organic phosphorus compounds considered suitable as starting materials may be arylphosphorus oxydihalides, alkylphosphorus oxydihalides, arylphosphorus sulfodihalide, alkylphosphorus sulfodihalide, arylphosphorus dihalides, alkylphosphorus dihalides, and similar compounds where the aryl or alkyl groups may contain substituted groups or radicals. Because of their availability, phenyl phosphorus oxydichloride, phenyl phosphorus sulfodichloride, and phenyl phosphorus dichloride are particularly the subject of this invention.

The dihydroxy aromatic reactants which are suitable include such compounds as hydroquinone, resorcinol, dihydroxy naphthalenes, dihydroxy diphenyls, etc., where the hydroxy radicals are attached to non-adjacent carbon atoms. Where the hydroxy radicals are on adjacent carbon atoms, their reaction with the phosphorus compound gives a closed ring definite type ester, whereas with non-adjacent hydroxy radicals there is no ring closure and the resulting product is a linear polymer.

The reaction for producing the linear type polymer may be illustrated by the following equation, showing the reaction of phenyl phosphorus oxydichloride and hydroquinone:

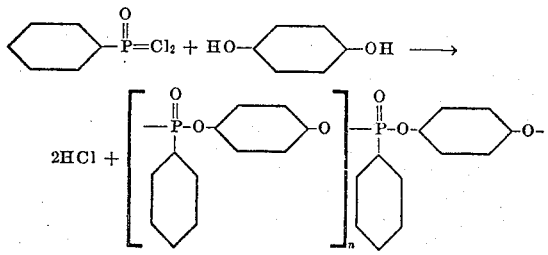

Variations in the time, temperature, and pressure conditions affect the physical characteristics of the resin product. A typical set of conditions for the production of strong, tough, satisfactory resin is shown in the following example:

61.4 parts (5% excess) of phenyl phosphorus oxydichloride was mixed with 33 parts (by weight) of hydroquinone in a reaction vessel and heated under the following successive conditions.

| Time, hrs. | Pressure, mm. | Temperature, °C. |
|---|---|---|
| 16.5 | Atm. pressure under $CO_2$ | 125–148 |
| 4.0 | Atm. pressure under $CO_2$ | 210–220 |
| 4.0 | 3.0 | 135–150 |
| 15.0 | 1.5 | 150–160 |
| 7.0 | 1.0 | 180–190 |
| 17.0 | 1.5 | 215–217 |
| 9.0 | 1.5 | 230–280 |
| 15.0 | 4.0 | 261–280 |
| 48.0 | 1.0 | 290–300 |

The resin product is a strong, tough horn-like product at ordinary temperatures. It softens at about 130° C. to form a clear thick viscous mass. Above this temperature it may be drawn into long fine fibers of remarkable strength. When drawn under strain the fiber strength is increased some 50% to 75%. At about 200° C. the molten resin may be drawn out in thin transparent sheets resembling Cellophane in appearance and flexibility. The resin is insoluble in hot or cold butyl acetate, carbon tetrachloride, benzene, ether, refined mineral oil, water, alcohol, and tricresyl phosphate. It is soluble in chloroform, ethylene chloride, and tetrachloroethane. An ethylene chloride solution of the resin makes an excellent transparent lacquer. This lacquer is a suitable protective covering for metal, glass, or wood. The lacquer film is not wetted by water, and is quite resistant to acid fumes.

Resin products having lower melting temperatures, greater solubility in organic solvents, but more brittle and less suitable for artificial fiber production, may be made by changing proportions of the reactants or changing the time, temperature, and pressure conditions. Apparently such products are less highly polymerized than the tough resin product described above. Such resins, however, may be suitable for use under particular circumstances. For example, they may be used with a wider variety of solvents to produce lacquer coatings to meet certain demands. This point is illustrated in the following example.

Equal molecular amounts of $C_6H_5POCl_2$ and hydroquinone were heated under vacuum (13 mm. pressure) at 70–80° C. for several hours, and then at 100–115° C. at atmospheric pressure for about 40 hours, then again under vacuum (1–2 mm. pressure) rapidly heated to about 360° C. On cooling, a reddish-brown transparent glass was obtained which was hard and brittle. This resin softened at 95° C. and completely melted at 105°

C. Fibers drawn from this resin were of poor strength. This resin was soluble in hot butyl acetate, alcohol, or tricresyl phosphate and cold acetone or chloroform.

In another example phenyl phosphorus oxydichloride was mixed with an excess of resorcinol and heated under vacuum (1–2 mm.) for 21 hours at 70–120° C., and 67 hours at 100–125° C. The product was then heated to above 360° C. to distill off the excess unreacted resorcinol. The resin product was a hard brittle glass which melts at about 85 to 90° C.

In another example phenyl phosphorus thiodichloride ($C_6H_5PSCl_2$) was heated together with hydroquinone to form a sulfur-containing resin. These resins require a longer time and higher temperature for their formation than do the oxygen-containing resins in the above examples. A temperature of about 180° C. is required to start the condensation reaction between $C_6H_5PSCl_2$ and hydroquinone. Consequently, it is preferred to use a catalyst to promote the reaction. Trivalent phosphorus compounds are satisfactory for this purpose, and result in lowering the reaction temperature to about 70 to 80° C.

In a typical example of the reaction and production of the sulfur-containing resin, 66.4 parts of $C_6H_5PSCl_2$ (5% excess) was mixed with 33 parts of hydroquinone and 0.5 part phenyl phosphorus dichloride ($C_6H_5PCl_2$) and heated for 6 hours at a temperature up to 205° C. at atmospheric pressure. The pressure was then reduced to less than 5 mm. and the mass heated 15 hours at 150–160° C.
9 hours at 180–185° C.
15 hours at 185–190° C.
9 hours at 205–215° C.
15 hours at 215–225° C.
48 hours at 235–245° C.

The resin was a dark-colored transparent glass with a melting point of about 166–172° C. and was soluble in chloroform, ethylene chloride, tetrachloroethane, and hot benzene. It could be drawn into long fine fibers of moderate strength. The strength was considerably improved by cold drawing. These fibers could be immersed in water for several weeks without loss of strength.

In another example, 66.4 grams of $C_6H_5PSCl_2$ and 33 grams of hydroquinone and 0.2 cc. $PCl_3$ as a catalyst were mixed in 100 cc. of trichlorobenzene solvent and heated under smoothly refluxing conditions at 220° C. for several hours. Evolution of hydrogen chloride began at about 195° C. After 47 hours of heating under reflux the condenser was removed and the solvent evaporated off. The mass was then heated under vacuum (2 mm. pressure) for 16 hours at 230–240° C., and 24 hours at 235–280° C. The product was a black translucent mass, very hard and tough, but could not be pulled out into fibers by ordinary means. It softened at about 125° C. but did not become liquid up to a temperature of 250° C. It became sticky and rubbery at high temperatures. It swelled in chlorinated hydrocarbons and then dissolved.

Resins obtained by the combined reaction and copolymerization of hydroquinone with phenyl phosphorus oxydichloride and phenyl phosphorus thiodichloride have properties which are intermediate between the resins obtained by the use of the separate phosphorus compounds.

In another example, 61.4 grams $C_6H_5POCl_2$ was heated with 48 grams 1,5 dihydroxynaphthalene

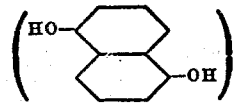

in a $CO_2$ atmosphere. Evolution of HCl started at about 80° C. and was vigorous at 140° C. The mass was heated to 230° C. for 2½ hours at atmospheric pressure, then at 210–230° C. for 17 hours under vacuum (4 mm. pressure), and 2 hours at 250° C. The product was a brittle, black colored resin melting at about 196–198° C.

It was also found that resins containing a trivalent phosphorus could be produced by condensing the organic phosphorus dihalides with the non-adjacent dihydroxy aromatic compounds. For example, 56.4 parts of redistilled phenyl phosphorus dichloride ($C_6H_5PCl_2$) and 33 parts hydroquinone were heated together in a $CO_2$ atmosphere. After 4 hours' heating the temperature reached 280° C. Some elemental phosphorus formed, but was flushed out of the reaction vessel by the stream of $CO_2$ gas. The clear viscous liquid was then heated for 40 hours at 260° C. under vacuum (6–7 mm. pressure). A clear amber-colored solid resin product was obtained which could not be melted for drawing into fibers. The resin had a phosphine-like odor. Less highly polymerized resins of this type should be suitable for stabilizing lubricating oils.

From the above examples, it is readily seen that a large number of phosphorus-containing linear type polymers can be made depending on the reaction and polymerizing conditions employed. These resins have utility in the production of artificial fibers, lacquer coatings, molding compositions, laminated glass, plasticizers for cellulose plastics, lubricating oil additive, and as fire retardant additive in inflammable plastics.

The foregoing detailed description has been given for clearness of understanding only, and no unnecessary limitations should be understood therefrom.

What I claim as new, and desire to secure by Letters Patent, is:

1. The method as set forth in claim 2, wherein the initial heating is at a temperature of 100 to 200° C. and the final heating is at a temperature above 200° C., and at a pressure not greater than atmospheric.

2. The method of producing phosphorus-containing resins which comprises heating equal molecular proportions of a phosphorus compound having the formula

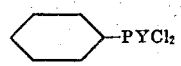

with an aryl compound having the formula HOROH wherein Y is a member of the class consisting of oxygen and sulfur when the phosphorus is pentavalent and is absent when the phosphorus is trivalent and R is aryl, the heating being carried out initially at a temperature sufficient to cause condensation with liberation of hydrogen chloride, then under reduced pressure at a temperature and period of time sufficient to effect a high degree of polymerization.

3. The method of claim 2 wherein the phosphorus compound is phenyl phosphorus oxydichloride.

4. The method of claim 2 wherein the phosphorus compound is phenyl phosphorus thiodichloride.

5. The method of claim 2 wherein the phosphorus compound is phenyl phosphorus dichloride.

6. The method of claim 2 wherein the aryl compound is hydroquinone.

7. The method of claim 2 wherein the aryl compound is 1,5-dihydroxynaphthalene.

8. A fusible linear polymer in which the repeating unit consists of

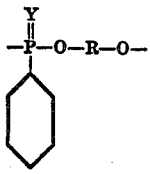

wherein R is aryl and Y is a member of the class consisting of oxygen and sulfur when the phosphorus is pentavalent and is absent when the phosphorus is trivalent.

9. A fusible linear polymer in which the repeating units consist of

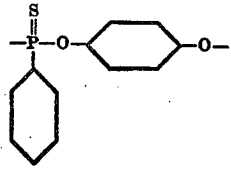

10. A fusible linear polymer in which the repeating units consist of

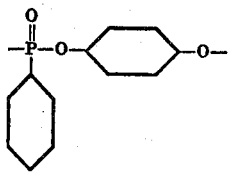

11. A fusible linear polymer in which the repeating units consist of

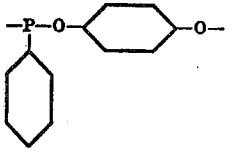

ARTHUR DOCK FON TOY.

REFERENCES CITED

The following references are of record in the file of this patent:

UNITED STATES PATENTS

| Number | Name | Date |
|---|---|---|
| 2,058,394 | Arvin | Oct. 27, 1936 |